(12) United States Patent
Dong et al.

(10) Patent No.: US 12,307,110 B2
(45) Date of Patent: *May 20, 2025

(54) RESOURCE ALLOCATION METHOD, STORAGE DEVICE, AND STORAGE SYSTEM

(71) Applicant: HUAWEI TECHNOLOGIES CO., LTD., Guangdong (CN)

(72) Inventors: Hao Dong, Chengdu (CN); Qinghang Xiao, Chengdu (CN); Chen Zhou, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,798

(22) Filed: Nov. 29, 2023

(65) Prior Publication Data

US 2024/0094933 A1 Mar. 21, 2024

Related U.S. Application Data

(63) Continuation of application No. 17/575,795, filed on Jan. 14, 2022, now Pat. No. 11,861,196, which is a
(Continued)

(30) Foreign Application Priority Data

Jul. 17, 2019 (CN) .......................... 201910646566.4
Oct. 9, 2019 (CN) .......................... 201910955603.X

(51) Int. Cl.
*G06F 12/00* (2006.01)
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0631* (2013.01);
(Continued)

(58) Field of Classification Search
CPC ...... G06F 3/064; G06F 3/0604; G06F 3/0631; G06F 3/0644; G06F 3/0662; G06F 3/067;
(Continued)

(56) References Cited

U.S. PATENT DOCUMENTS 6,578,128 B1 6/2003 Arsenault et al.
6,643,722 B1 11/2003 Scaringella et al.
(Continued)

FOREIGN PATENT DOCUMENTS

CN 102033768 A 4/2011
CN 102446159 A 5/2012
(Continued)

OTHER PUBLICATIONS

Zhao Yong,"Research and Implementation of High Performance Secure Storage System Based on Multi-core Network Processor",Xian Polytechnic University,2018, with an English abstract, total 69 pages.
(Continued)

*Primary Examiner* — John A Lane

(57) ABSTRACT

A resource allocation method and a storage device are provided. The storage device includes a disk enclosure and a plurality of controllers. Each controller includes a plurality of processors, each processor includes a plurality of processor cores, the plurality of controllers are separately coupled to the disk enclosure including a plurality of hard disks. The plurality of processors are configured to provide computing resources. The plurality of hard disks are configured to provide storage space. Logical addresses corresponding to the storage space are classified into several address segment
(Continued)

sets, each address segment set includes one or more address segments, some of the computing resources are allocated to each address segment set, and are used to execute a data access request for accessing an address segment comprised in the address segment set. Computing resources used to process different address segment sets are from different processors or from different processor cores.

20 Claims, 12 Drawing Sheets

Related U.S. Application Data continuation of application No. PCT/CN2020/088784, filed on May 6, 2020.

(52) U.S. Cl.
CPC .......... *G06F 3/0644* (2013.01); *G06F 3/0662* (2013.01); *G06F 3/067* (2013.01); *G06F 12/0284* (2013.01)

(58) Field of Classification Search
CPC .... G06F 12/0284; G06F 3/061; G06F 3/0658; G06F 3/0683
See application file for complete search history.

(56) References Cited

U.S. PATENT DOCUMENTS

| | | | | |
|---|---|---|---|---|
| 2007/0180188 A1* | 8/2007 | Fujibayashi | ........ | H04L 67/1097 711/112 |
| 2008/0046695 A1 | 2/2008 | Ishizuka et al. | | |
| 2009/0144531 A1 | 6/2009 | Harikumar et al. | | |
| 2019/0018785 A1* | 1/2019 | Beard | ................. | G06F 12/0653 |
| 2019/0114076 A1 | 4/2019 | Wei et al. | | |
| 2021/0081292 A1* | 3/2021 | Jmt | ..................... | G06F 11/3409 |

FOREIGN PATENT DOCUMENTS

| | | | |
|---|---|---|---|
| CN | 104995603 | A | 10/2015 |
| CN | 105278940 | A | 1/2016 |
| CN | 105677580 | A | 6/2016 |
| CN | 109407975 | A | 3/2019 |
| JP | 2007501458 | A | 1/2007 |
| JP | 2008059353 | A | 3/2008 |
| JP | 2008134775 | A | 6/2008 |
| JP | 2015529862 | A | 10/2015 |
| WO | 2014192144 | A1 | 12/2014 |
| WO | 2016121066 | A1 | 8/2016 |

OTHER PUBLICATIONS

Anonymous Issue: "Huawei OceanStor Dorado V3 All-Flash Storage Systems Performance Technical White Paper", Oct. 30, 2018 (Oct. 30, 2018), XP055937861, Total 31 Pages.

Chun Liu: "Huawei OceanStor Dorado Architectural Deep Dive with Chun Liu", Mar. 13, 2018 (Mar. 13, 2018), XP055937933, Total 2 Pages.

Anonymous: "Huawei OceanStor Dorado V3 All-Flash Storage Systems Technical White Paper", Oct. 30, 2018 (Oct. 30, 2018), XP055930195, Total 81 Pages.

* cited by examiner

RESOURCE ALLOCATION METHOD, STORAGE DEVICE, AND STORAGE SYSTEM

CROSS-REFERENCE TO RELATED APPLICATIONS

This application is a continuation of U.S. patent application Ser. No. 17/575,795, filed on Jan. 14, 2022, which is a continuation of International Application No. PCT/CN2020/088784, filed on May 6, 2020, which claims priority to Chinese Patent Application No. 201910955603. X, filed on Oct. 9, 2019, and Chinese Patent Application No. 201910646566.4, filed on Jul. 17, 2019. All of the aforementioned patent applications are hereby incorporated by reference in their entirety.

TECHNICAL FIELD

This application relates to the storage field, and more specifically, to a resource allocation method, a storage device, and a storage system.

BACKGROUND

A current storage node usually has a plurality of controllers, and each controller includes a plurality of processors. When the storage node executes a service request, the plurality of processors usually need to process in parallel a plurality of sub-requests obtained by splitting the service request. Because these sub-requests are associated with each other, forwarding and data interaction of the sub-requests between the plurality of processors are involved, and bandwidth resources between the processors are occupied.

SUMMARY

This application mainly aims to resolve a problem of how to save bandwidth resources between processors.

According to a first aspect, a storage device is provided, including a disk enclosure and a plurality of controllers. Each controller includes a plurality of processors, each processor includes a plurality of processor cores, the plurality of controllers are separately coupled to the disk enclosure, and the disk enclosure includes a plurality of hard disks. The plurality of processors are configured to provide computing resources. The plurality of hard disks are configured to provide storage space. Logical addresses corresponding to the storage space are classified into several address segment sets, each address segment set includes one or more address segments, some of the computing resources are allocated to each address segment set, and the some computing resources are used to execute a data access request for accessing an address segment included in the address segment set. Computing resources allocated to different address segment sets are from different processors, or computing resources allocated to different address segment sets are from different processor cores.

For the address segment in the first aspect, because the storage space are virtualized into logical units (LUs), the LUs are provided by the storage device for a user, and addresses corresponding to the LUs are classified into several logical block address LBA intervals, each address segment is one LBA interval.

The first aspect actually provides two specific implementations. In one implementation, computing resources used to process different address segment sets are from different processors. Because a data access request used to access an address segment is executed by an allocated processor, and different CPUs are allocated to different address segment sets, a data access request can be prevented from being forwarded between a plurality of processors, and fewer bandwidth resources between the processor need to be used. In the other implementation, computing resources used to process different address segment sets are from different processor cores. Because a data access request used to access an address segment is executed by an allocated processor core, compared with the foregoing implementation, data access requests for different address segment sets are isolated at a finer granularity, and the data access requests are executed in series by processor cores allocated to the data access requests, thereby reducing mutually exclusive operations, and implementing a lock-free design.

In an optional implementation, each processor has a memory, the computing resources further include a plurality of memories included in the plurality of processors, and one memory is allocated to one address segment set. Different memories are allocated to different address segment sets.

In an optional implementation, a memory allocated to each address segment set is a local memory of a processor that is allocated to the address segment set. In an actual application scenario, a processor has a memory, which is also referred to as a local memory of the processor. The local memory is usually integrated into a component together with the processor, or is directly or indirectly coupled to the processor. In this case, during memory allocation, the local memory of the processor that is allocated to the address segment set may be preferentially allocated to the address segment set. Using the nearby local memory of the processor can avoid cross-CPU data transmission.

In an optional implementation, the storage device further includes network resources, the network resources are provided by a plurality of connections between the plurality of controllers and the disk enclosure, and some of the network resources are allocated to each address segment set. Different connections are allocated to different address segment sets.

In an optional implementation, the storage space includes a plurality of chunk groups, the plurality of chunk groups provide storage resources, and some of the storage resources are allocated to each address segment set. Different address segment sets are allocated to different chunk groups.

In an optional implementation, the storage device further includes a front-end interface card, the plurality of controllers are separately coupled to the front-end interface card, the front-end interface card stores a mapping table, and the mapping table is used to indicate a mapping relationship between each address segment set and allocated computing resources.

Optionally, the mapping table is further used to indicate a mapping relationship between each address segment set and allocated network resources.

Optionally, the mapping table is further used to indicate a mapping relationship between each address segment set and allocated hard disk resources.

In an optional implementation, several virtual nodes are created in the storage device, one virtual node is mapped to one address segment set by using a preset algorithm, and the mapping table records a mapping relationship between each virtual node and computing resources allocated to an address segment set to which the virtual node is mapped.

Optionally, the mapping table further records a mapping relationship between each virtual node and network resources allocated to an address segment set to which the virtual node is mapped.

Optionally, the mapping table further records a mapping relationship between each virtual node and hard disk resources allocated to an address segment set to which the virtual node is mapped.

In an optional implementation, the storage device further includes a newly added controller, the newly added controller includes a processor, and the newly added controller is coupled to the disk enclosure. The newly added controller is configured to: use the processor included in the newly added controller as a computing resource, allocate the processor to a first address segment in an address segment set, and release an allocation relationship between the first address segment and computing resources allocated to the address segment set. When new resources are added to a storage system, this implementation can slightly change a mapping relationship between an address segment and an original resource.

According to a second aspect of this application, a resource allocation method is provided. The method is applied to the storage device provided in any one of the implementations of the first aspect, and is used to implement functions of the storage device.

According to a third aspect of this application, a computer program product is provided. When the computer program product is run on a storage device, the storage device is enabled to perform the resource allocation method in the second aspect.

According to a fourth aspect of this application, a computer-readable storage medium is provided. The computer-readable storage medium stores an instruction, and when the instruction is run on a storage device, the storage device is enabled to perform the resource allocation method in the second aspect.

According to a fifth aspect of this application, a storage node is provided. The storage node includes a plurality of controllers. A plurality of virtual nodes are created in the storage node, computing resources are pre-allocated to the virtual nodes, and the computing resources are from a computing resource pool. Several data access requests received by the storage node are routed to the plurality of virtual nodes. Each data access request corresponds to one virtual node, and each data access request is executed by using a computing resource allocated to a corresponding virtual node. The plurality of controllers are configured to provide computing resources for the computing resource pool, and the computing resources are provided by a plurality of processors included in the plurality of controllers. One processor is allocated to one virtual node, and different processors are allocated to different virtual nodes. Alternatively, one processor is allocated to a plurality of virtual nodes, and different processor cores are allocated to different virtual nodes.

In an optional implementation of the fifth aspect, each processor has a memory, and the computing resource pool further includes a plurality of memories included in the plurality of processors. One memory is allocated to one virtual node, and different memories are allocated to different virtual nodes.

In an optional implementation of the fifth aspect, a memory allocated to each virtual node is a local memory of a processor that is allocated to the virtual node.

In an optional implementation of the fifth aspect, the plurality of controllers are separately coupled to a disk enclosure, and the disk enclosure includes a plurality of hard disks. Network resources are further pre-allocated to the virtual nodes, the network resources are from a network resource pool, and the network resource pool is provided by connections between the plurality of controllers and the disk enclosure. Each virtual node corresponds to one or more connections, and different connections are allocated to different virtual nodes.

In an optional implementation of the fifth aspect, hard disk resources are further pre-allocated to the virtual nodes, the hard disk resources are from a hard disk resource pool, and the hard disk resource pool is provided by the plurality of hard disks. Each virtual node corresponds to one or more chunk groups, and different chunk groups are allocated to different virtual nodes.

In an optional implementation of the fifth aspect, the storage node further includes a front-end interface card, the front-end interface card is coupled to the plurality of controllers, and the front-end interface card stores a correspondence between each virtual node and allocated computing resources, and/or a correspondence between each virtual node and allocated network resources, and/or a correspondence between each virtual node and allocated hard disk resources.

In an optional implementation of the fifth aspect, the front-end interface card is further configured to: receive a first data access request sent by a host, where the data access request includes a virtual address; determine, based on the virtual address, a first virtual node corresponding to the first data access request; determine, based on the stored correspondence, a first processor allocated to the first virtual node; and forward the first data access request to the first processor. The first processor is configured to process the first data access request.

In an optional implementation of the fifth aspect, data or metadata used when the first data access request is processed is temporarily stored in a first memory corresponding to the first virtual node.

In an optional implementation of the fifth aspect, the first processor is further configured to: send, to the disk enclosure through a first connection allocated to the first virtual node, data that the first data access request requests to write, so that the data is written into a first chunk group allocated to the first virtual node, or write, into the first memory through the first connection, data that the first data access request requests to read.

According to a sixth aspect of this application, another resource allocation method is provided. The method is applied to a storage node, the storage node includes a plurality of controllers, and each controller includes a plurality of processors. The method includes: creating a plurality of virtual nodes; and allocating computing resources to the virtual nodes. Several data access requests received by the storage node are routed to the plurality of virtual nodes, each data access request corresponds to one virtual node, and each data access request is executed by using a computing resource allocated to a corresponding virtual node. Each of the processors is allocate to one of the plurality of virtual nodes, and different processors are allocated to different nodes.

In an optional implementation of the sixth aspect, the computing resources are from a computing resource pool, the computing resources in the computing resource pool are provided by the plurality of controllers, and the computing resource pool includes the plurality of processors.

In an optional implementation of the sixth aspect, the creating a plurality of virtual nodes includes: creating the plurality of virtual nodes based on a quantity of processors included in the storage node. A quantity of the plurality of virtual nodes is less than or equal to a quantity of processors included in the storage node.

According to a seventh aspect of this application, a computer program product is provided. When the computer program product is run on a controller of a storage node, the controller is enabled to perform the resource allocation method in the sixth aspect.

According to an eighth aspect of this application, a computer-readable storage medium is provided. The computer-readable storage medium stores an instruction, and when the instruction is run on a controller of a storage node, the controller is enabled to perform the resource allocation method in the sixth aspect.

According to a ninth aspect of this application, a storage system is provided, including a host and a plurality of storage nodes. Storage space provided by the plurality of storage nodes is classified into several address segment sets, and each address segment set includes one or more address segments. The host is configured to: generate a data access request, where the data access request includes a virtual address; determine, based on the virtual address, an address segment set corresponding to target data, where the address segment set indicates a target storage node that processes the data access request, and the target storage node is one of the plurality of storage nodes; and send the data access request to the target storage node, so that the target storage node processes the data access request by using a resource that is pre-allocated to the address segment set corresponding to the target data. Processing performed by the target storage node on the data access request is similar to that in the first aspect.

According to a tenth aspect of this application, a data processing method is provided. The method may be applied to the storage device provided in the first aspect, or may be applied to the storage node provided in the fifth aspect, or may be applied to the storage system. The method includes: receiving a data access request, where the request carries a virtual address; uniquely determining an address segment set or a virtual node based on the virtual address, where computing resources are allocated to the address segment set (or the virtual node); and processing the data access request by using the allocated computing resources.

In an optional implementation of the tenth aspect, a network resource and a hard disk resource are further allocated to the address segment set (or the virtual node), and the method further includes: reading data from the hard disk resource by using the allocated network resource, or storing to-be-written data in the hard disk resource.

According to the storage system provided in this application, different processors are allocated to data access requests for accessing different address segment sets, so that request or data forwarding between processors can be avoided to some extent, thereby saving bandwidth resources between the processors. Alternatively, different processor cores are allocated to data access requests for accessing different address segment sets, so that request or data forwarding between processor cores can be further avoided. In addition, resources allocated to data access requests for accessing different address segment sets are independent of each other, so that fewer mutually exclusive operations can be performed, and a lock-free design can be implemented.

According to an eleventh aspect of this application, a capacity expansion method of a storage node is provided. The storage node includes a first controller, and the first controller includes a plurality of processors. When a second controller is added to the storage node, a second virtual node set is created. The second controller includes a plurality of processors, and the second virtual node set includes a plurality of second virtual nodes. Before the second virtual node set is created, there is a first virtual node set in the storage node. The first virtual node set includes a plurality of first virtual nodes, and several data access requests received by the storage node are routed to the plurality of first virtual nodes. The plurality of processors included in the second controller are added to a computing resource pool, and the computing resource pool includes the plurality of processors provided by the first controller. Computing resources are allocated to the plurality of second virtual nodes, and the allocated computing resources are from the computing resource pool. One processor is allocated to each second virtual node, and different processors are allocated to different second virtual nodes. Some of the plurality of data access requests routed to the first virtual node are reallocated to the second virtual node.

According to a twelfth aspect of this application, a storage node is provided, configured to implement the method provided in the eleventh aspect.

According to the capacity expansion method of the storage node provided in the eleventh aspect of this application and the storage node provided in the twelfth aspect of this application, several virtual nodes are created, and resources are allocated to the virtual nodes. When a quantity of computing resources of the storage node increases, a quantity of virtual nodes may correspondingly increase, newly added computing resources are allocated to newly added virtual nodes, and some of data access requests routed to the original virtual nodes may be reallocated to the newly added virtual nodes. In this way, a processing capability of the entire storage node also increases. Therefore, when a quantity of hardware resources increases, a processing capability of the storage node also linearly increases.

DESCRIPTION OF EMBODIMENTS

This application mainly aims to resolve a problem of how to save bandwidth resources between processors. The following describes technical solutions of this application with reference to accompanying drawings.

Figure 1:
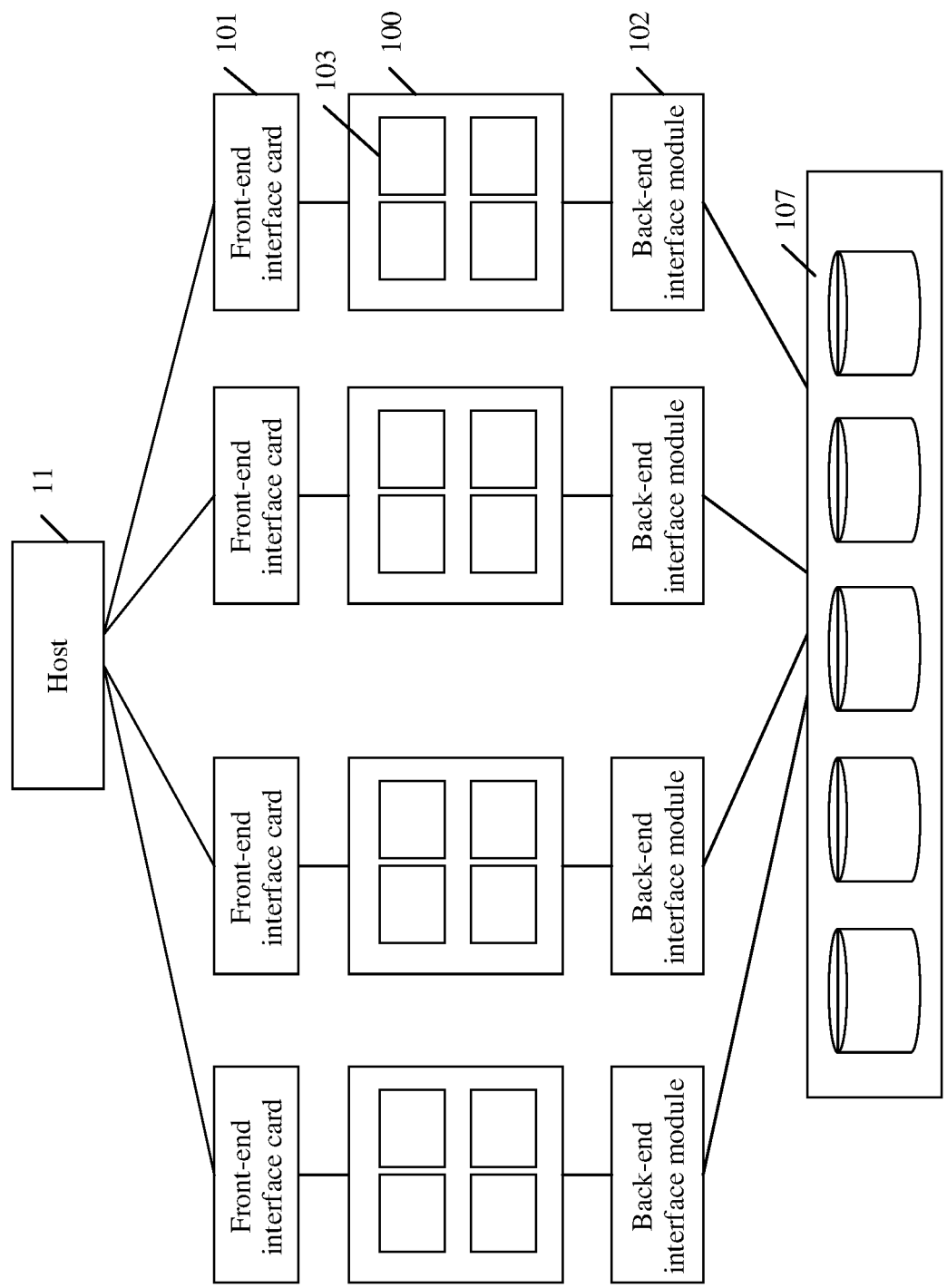
FIG. 1 is a schematic diagram of a scenario to which technical solutions in embodiments of the present disclosure can be applied.

FIG. 1 is a schematic diagram of a scenario to which technical solutions in embodiments of this application can be applied. As shown in FIG. 1, a host 11 communicates with a storage system, and the storage system includes a plurality of storage nodes (or referred to as "nodes" for short) 100. Each storage node 100 is one storage engine (referred to as an engine for short), and each node 100 includes a plurality of controllers 103. Each controller 103 includes a plurality of processors, and each processor includes a plurality of processor cores. In addition, each node 100 has a front-end interface card 101 and a back-end interface card 102. The front-end interface card 101 is used for communication between the node 100 and the host 11, and the back-end interface card 102 is used for communication between the node 100 and a plurality of disk enclosures. Each disk enclosure includes a plurality of hard disks 107. The hard disk is configured to store data, and may be a disk or another type of storage medium, for example, a solid-state drive or a shingled magnetic recording hard disk. The front-end interface card 101 is directly connected to the plurality of controllers 103 included in each node through an internal network channel, and the back-end interface card 102 is also directly connected to the plurality of controllers 103 included in each node through an internal network channel (FIG. 1 shows only some connections), to ensure that the controllers 103 in each node 100 can receive and send services by using the front-end interface card 101 or the back-end interface card 102. In addition, each node 100 may be connected to the disk enclosure by using the back-end interface card 102, to implement data sharing between nodes. In some application scenarios, one or more storage nodes 100 and a disk enclosure may be collectively referred to as a storage device.

Figure 2:
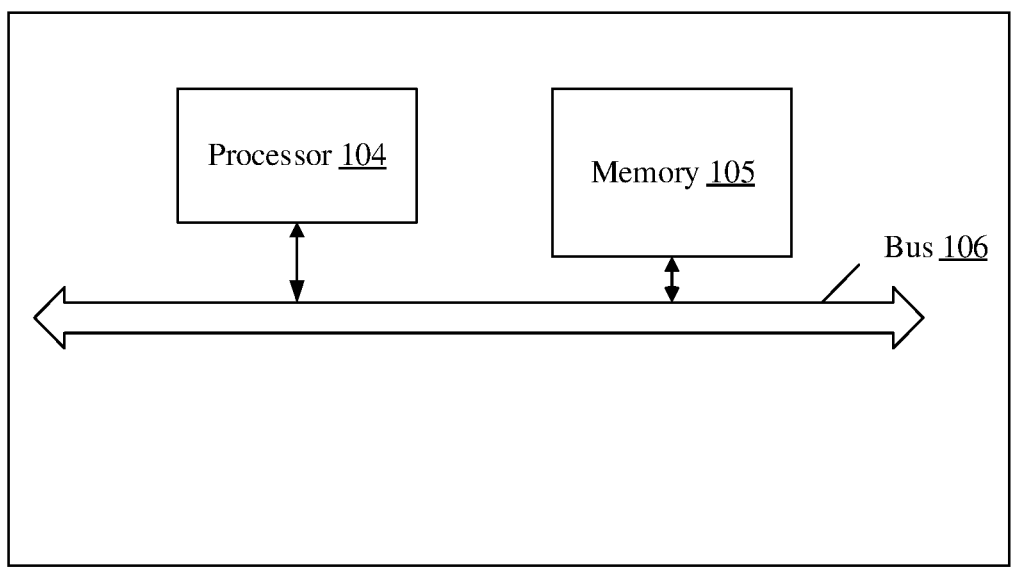
FIG. 2 is a schematic structural diagram of a storage node according to an embodiment of the present disclosure.

The controller 103 is a computing device, for example, a server or a desktop computer. In terms of hardware, as shown in FIG. 2, the controller 103 includes at least a processor 104, a memory 105, and a bus 106. The processor 104 is a central processing unit (CPU), and is configured to process an I/O request from the node 100 or a request generated in the controller 103. One controller 103 may include a plurality of processors 104, and each processor includes a plurality of processor cores (not shown in the figure). The memory 105 is configured to temporarily store data received from the host 11 or data read from the hard disk. When receiving a plurality of write requests sent by the host 11, the controller 103 may temporarily store data in the plurality of write requests in the memory 105. When a capacity of the memory 105 reaches a specific threshold, the data stored in the memory 105 is sent to the hard disk for storage. The memory 105 includes a volatile memory, a non-volatile memory, or a combination thereof. The volatile memory is, for example, a random-access memory (RAM). The non-volatile memory is, for example, any machine readable medium that can store program code, such as a flash memory chip, a floppy disk, a hard disk, a solid state disk (SSD), or an optical disc. The memory 105 has a power-off protection function. The power-off protection function means that the data stored in the memory 105 is not lost when the system is powered off and then powered on again. The bus 106 is configured to implement communication between the components in the controller 103.

Storage space provided by the controller 103 for the host 11 is from the plurality of hard disks 107, but an actual address of the storage space provided by the hard disks is not directly exposed to the controller 103 or the host 11. In actual application, physical storage space is virtualized into several logical units (LU), which are provided for the host 11, and each logical unit has a unique logical unit number (LUN). Because the host 11 can directly sense the logical unit number, a person skilled in the art usually directly refers to the LUN as the logical unit. Each LUN has a LUN ID, which is used to identify the LUN. A specific location of data in an LUN may be determined based on a start address and a length of the data. A person skilled in the art usually refers to a start address as a logical block address (LBA). It can be understood that three factors: an LUN ID, an LBA, and a length identify a specific address segment. The host 11 generates a data access request, and the data access request usually carries an LUN ID, an LBA, and a length. For ease of description, in this embodiment, the LUN ID, the LBA, and the length are referred to as a virtual address. It can be known from the foregoing descriptions that an LUN to be accessed by the request and a specific location of the LUN may be determined based on the virtual address. The controller 103 stores a correspondence between the virtual address and an address at which the data is stored in the hard disk. Therefore, after receiving the data access request, the controller 103 may determine a corresponding physical address based on the correspondence, and indicate the hard disk to read or write the data.

To ensure that data is evenly stored in each storage node 100, a distributed hash table (DHT) manner is usually used for routing when a storage node is selected. In the distributed hash table manner, a hash ring is evenly divided into several parts, each part is referred to as one partition, and one partition corresponds to one address segment described above. All data access requests sent by the host 11 to the storage system are located to one address segment. For example, data is read from the address segment, or data is written into the address segment. It should be understood that a CPU resource, a memory resource, and another resource in the storage system need to be used (the CPU resource and the memory resource are usually combined into a computing resource in the industry) to process these data access requests. The CPU resource and the memory resource are provided by the controller 103. The storage node usually has a plurality of controllers 103, and each controller 103 includes a plurality of processors. When the storage node executes a service request, a plurality of processors usually need to process in parallel a plurality of sub-requests obtained by splitting the service request. Because these sub-requests are associated with each other, forwarding and data interaction of the sub-requests between the plurality of processors are involved, and bandwidth resources between the processors are occupied.

To resolve this problem, in this embodiment of this application, one CPU or one or more CPU cores in one CPU are allocated to one address segment set. The address segment set includes one or more address segments, and the address segments may be consecutive or nonconsecutive. All data access requests for accessing these address segments are executed by the allocated CPU, or executed by the allocated one or more CPU cores. Different CPUs or different CPU cores in one CPU are allocated to different address segment sets.

Figure 13:
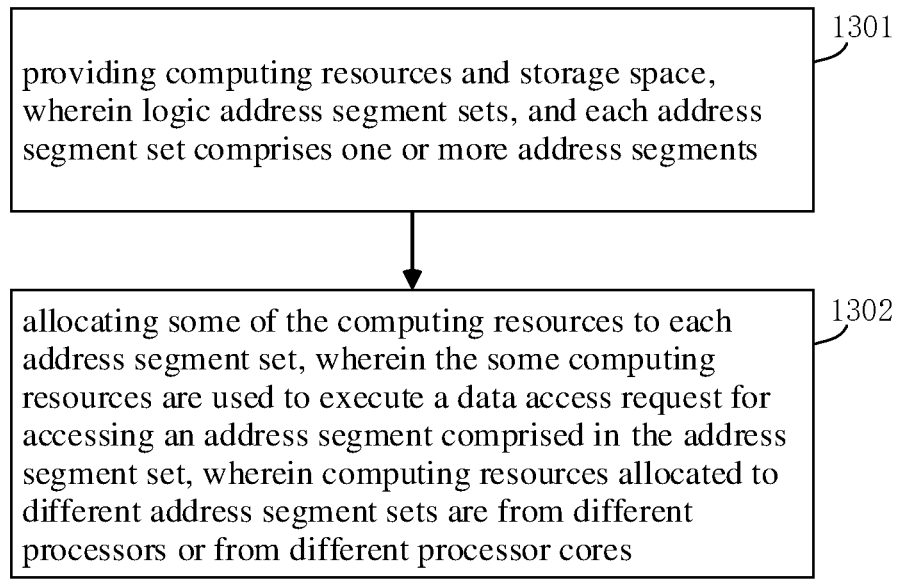
FIG. 13 is a schematic flowchart of another capacity expansion method according to an embodiment of the present disclosure.

Further, in this embodiment of this application, one memory is allocated to each address segment set, and data (including both service data and metadata) related to a data access request for accessing an address segment included in the address segment set is temporarily stored in the allocated memory. Specifically, one memory is allocated to one address segment set, and different memories are allocated to different address segment sets. The memory herein includes but is not limited to the memory 105 in FIG. 2. In an actual application scenario, a processor has a memory, which is also referred to as a local memory of the processor. The local memory is usually integrated into a component together with the processor, or is directly or indirectly coupled to the processor. In this case, during memory allocation, the local memory of the processor that is allocated to the address segment set may be preferentially allocated to the address segment set. It should be noted that the foregoing memory allocation manner is merely an implementation provided in this embodiment of this application, and another implementation may be used. For example, no memory is pre-allocated to an address segment set, and a memory is selected from a plurality of memories included in the storage system when any data access request needs to use a memory. FIG. 13 is a schematic flowchart of a capacity expansion method according to an embodiment of the present disclosure In addition to a CPU resource and a memory resource, resources used to process a data access request may further include a network resource and a hard disk resource. Optionally, both the network resource and the hard disk resource may be pre-allocated to different address segment sets.

When a new resource is added to the storage system, the new resource and an original resource may be integrated and then reallocated to the address segment sets. One implementation is to re-divide address segment sets, keep a quantity of address segments unchanged, increase a quantity of address segment sets, reduce a quantity of address segments included in each address segment set, and then reallocate resources of the storage system to the adjusted address segment sets. Another implementation is to maintain an allocation relationship between some address segments in each address segment set and original resources, and allocate newly added resources to the other address segments in the address segment set. This implementation can reduce a change of a mapping relationship between an address segment and an original resource.

To better implement resource isolation between data access requests for different address segment sets, several virtual nodes are created in the storage system in this application. The virtual node is a minimum unit for resource allocation. Resources in the storage system may be classified into several equal parts, and each equal part corresponds to one virtual node. Specifically, each virtual node corresponds to some CPU resources, some memory resources, some network resources, and some hard disk resources. For example, if the storage system has four nodes 100, each node has four controllers 103, each controller has four CPUs, and each CPU has 48 CPU cores, one node 100 has 768 CPU cores in total. If the storage system includes four nodes, there are 3072 cores in total. If each CPU corresponds to 256 GB memory, one controller has 1 TB memory, one node has 4 TB memory, and the storage system has 16 TB memory in total. If all hardware resources included in the storage system are classified into 256 equal parts, there are 256 virtual nodes, a CPU resource corresponding to each virtual node is 12 CPU cores, and a memory resource corresponding to each virtual node is 0.0625 TB. As described above, one partition corresponds to one address segment. After a virtual node is introduced, one partition set corresponds to one virtual node, and one partition set includes a plurality of partitions. Correspondingly, one address segment set corresponds to one virtual node, and one address segment set includes a plurality of address segments. In other words, an address segment is used as an input, and after calculation is performed by using a preset algorithm, a partition can be uniquely determined, and a virtual node can be further uniquely determined. Assuming that there are 1024 partitions in the storage system and 32 virtual nodes are created in the storage system, each virtual node corresponds to 32 partition sets, and each partition set includes 32 partitions. Generally, a quantity of partitions included in the storage system remains unchanged. Even if virtual nodes are added to or removed from the storage system, only the 1024 partitions are re-allocated in the virtual nodes that are added or removed.

It should be understood that creating a virtual node is not the only manner for implementing resource isolation. If there is no virtual node, resources may be directly allocated to each address segment set according to the foregoing description.

For creation of a virtual node in the storage system, this embodiment provides at least two creation manners.

Figure 14:
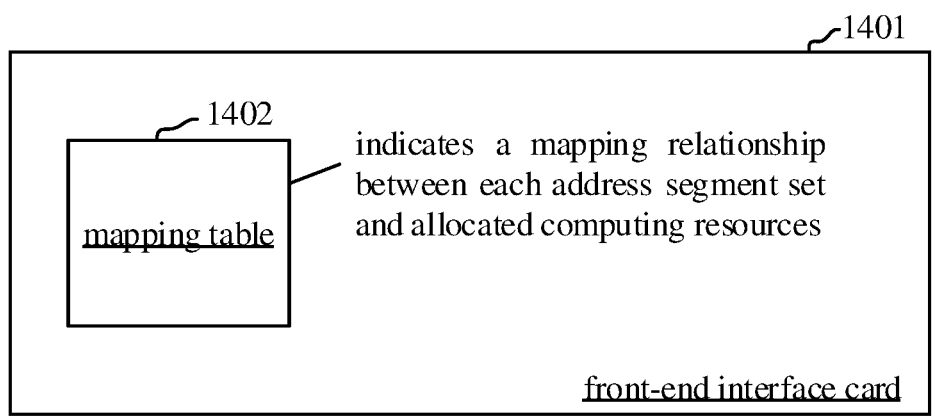
FIG. 14 is a schematic diagram of front-end interface card according to an embodiment of the present disclosure.

In one manner, the virtual node is automatically created during initialization of the storage system. A specific process is as follows:

The virtual node may be created based on any one of (1) a quantity of storage nodes, (2) a quantity of controllers, and (3) a quantity of CPUs that are included in the system, and a combination thereof. A quantity of created virtual nodes is less than or equal to the quantity of CPUs included in the system. Then, a resource is allocated to each virtual node, a mapping relationship between each virtual node and the allocated resource is created (for this part of content, refer to the following descriptions of FIG. 3 to FIG. 6), and the created mapping relationship is stored in the host 11 and the front-end interface card 101. FIG. 14 is a schematic diagram of front-end interface card according to an embodiment.

In another manner, during initialization of the storage system, management software of the storage system provides an interface for an administrator. The administrator selects a quantity of to-be-created virtual nodes in the interface. Then, the storage system creates virtual nodes according to an instruction, allocates a resource to each virtual node, creates a mapping relationship between each virtual node and the allocated resource (for this part of content, refer to the following descriptions of FIG. 3 to FIG. 6), and stores the created mapping relationship in the host 11 and the front-end interface card 101. Similarly, the administrator may select a quantity of virtual nodes based on any one of (1) a quantity of storage nodes, (2) a quantity of controllers, and (3) a quantity of CPUs, a combination thereof, or based on another factor.

In either of the foregoing creation manners, a quantity of virtual nodes may be adjusted during running of the storage system. For example, the quantity of virtual nodes may be increased when a controller is added to the storage system, or the quantity of virtual nodes may be reduced when a controller is removed from the storage system, or the quantity of virtual nodes may be increased when a disk enclosure is added to the storage system, or the quantity of virtual nodes may be reduced when a disk enclosure is removed from the storage system. Even if a quantity of resources does not change, the storage system can still adjust the quantity of virtual nodes as specified by the administrator.

Figure 3:
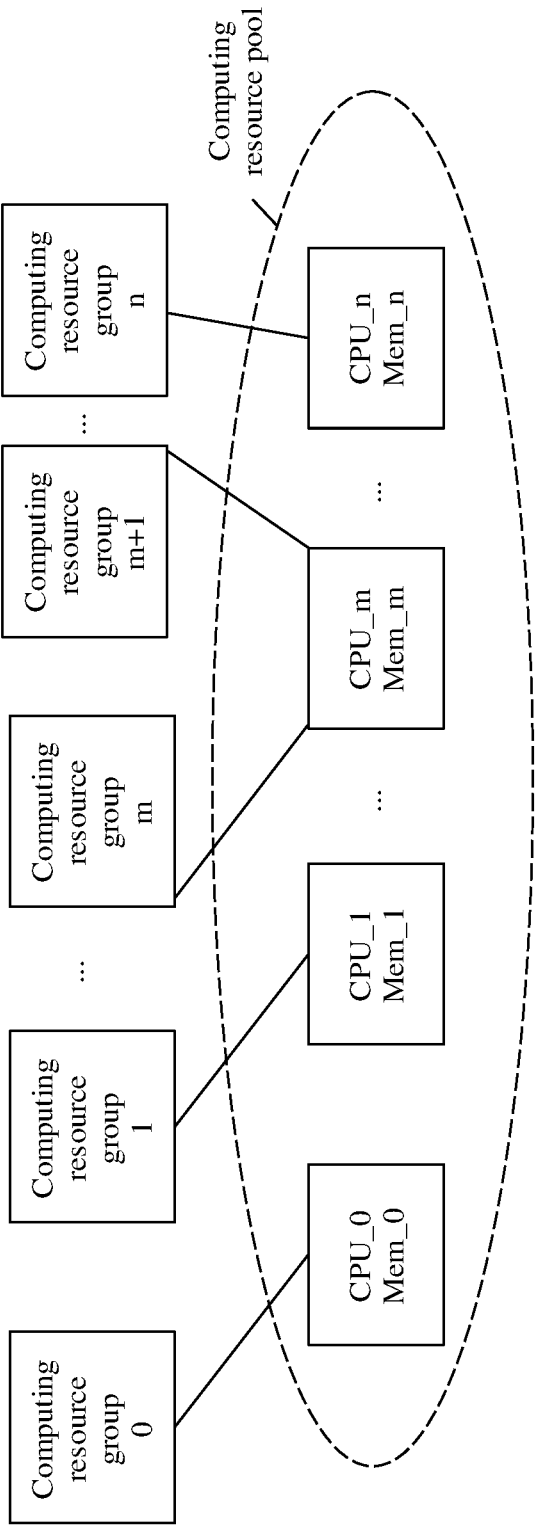
FIG. 3 is a schematic diagram of a relationship between a virtual node, a processor resource, and a memory resource according to an embodiment of the present disclosure.

FIG. 3 is a schematic diagram of an allocation relationship between a virtual node, a CPU resource, and a memory resource according to an embodiment of this application. As shown in FIG. 3, all CPUs and all memories in the storage system form a computing resource pool, the CPU resources and the memory resources included in the computing resource pool are classified into several computing resource groups, and each computing resource group is allocated to one virtual node. Different virtual nodes occupy different computing resource groups. Each computing resource group may use one CPU, or a plurality of computing resource groups may share one CPU. For example, a computing resource group 0 uses a CPU_0, a computing resource group 1 uses a CPU_1, a computing resource group m and a computing resource group m+1 share a CPU_m, and a computing resource group n uses a CPU_n, where both m and n are integers greater than 1, and n is greater than m. It may be understood that there is further one or more computing resource groups between the computing resource group n and the computing resource group m. When a plurality of computing resource groups share one CPU, because the CPU includes a plurality of CPU cores (for example, 48 CPU cores), the plurality of CPU cores included in the CPU may be classified into a plurality of core groups, and each core group (including one or more CPU cores) is allocated to one virtual node. In addition, each computing resource group further includes a memory resource, and the memory resource included in each computing resource group may be a local memory of a CPU included in the computing resource group. After such a configuration, a data access request corresponding to a virtual node is run on an allocated CPU, and the virtual node may use a local memory resource of the nearby CPU. A local memory of a CPU is a memory that is located in the same node as the CPU. Specifically, for example, a memory resource used by the computing resource group 0 is a Mem_0, and the Mem_0 is a local memory of the CPU_0. A memory resource used by the computing resource group 1 is a Mem_1, and the Mem_1 is a local memory of the CPU_1. The computing resource group m and the computing resource group m+1 share a Mem_m, and the Mem_m is a local memory of the CPU_m. A memory resource used by the computing resource group n is a Mem_n, and the Mem_n is a local memory of the CPU_n. In this embodiment, one computing resource group is allocated to each virtual node. Therefore, different CPU resources and memory resources may be used for service requests corresponding to different virtual nodes, thereby avoiding resource contention. In addition, if no resource is not allocated to each virtual node in a conventional manner, when a data access request is executed, a plurality of CPUs usually need to process in parallel a plurality of sub-requests obtained by splitting the request. Because these sub-requests are associated with each other, the CPUs schedule or forward the sub-requests when processing sub-requests. However, in the manner provided in this embodiment, each virtual node corresponds to one CPU, or a plurality of virtual nodes share one CPU. Therefore, a service request allocated to a virtual node is executed by a specified CPU, thereby reducing scheduling and forwarding between CPUs. In addition, if different data access requests share one memory, some mutually exclusive operations are inevitably performed to implement data consistency. However, in the manner in this embodiment, different memories are allocated to data access requests for accessing different address segment sets, thereby reducing mutually exclusive operations to some extent.

It should be noted that the computing resource pool is only an implementation provided in this embodiment, and this embodiment may further provide another implementation. For example, some or all CPUs in the storage system form CPU resources, and some of the CPU resources are allocated to each virtual node. For another example, some or all memories in the storage system form memory resources, and some of the memory resources are allocated to each virtual node.

Figure 4:
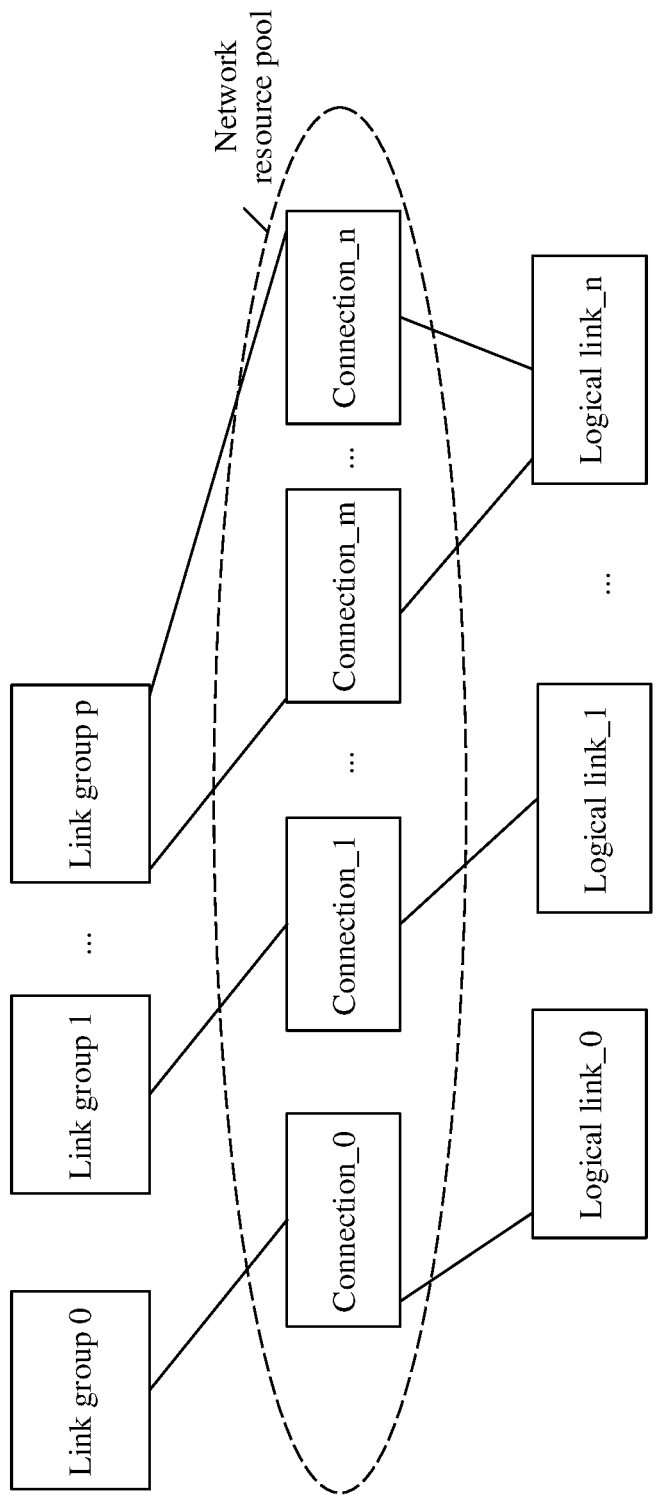
FIG. 4 is a schematic diagram of a relationship between a virtual node and a network resource according to an embodiment of the present disclosure.

The network resources in this embodiment of this application mainly include link resources between the controller 103 and the disk enclosure. A plurality of logical links may be created on each back-end interface card 102, a plurality of connections may be established on each logical link, and these connections form a network resource pool. FIG. 4 is a schematic diagram of an allocation relationship between a virtual node and a network resource according to this application. As shown in FIG. 4, the connections included in the network resource pool are classified into several link groups, and each link group uses one or more connections. For example, a link group 0 uses a connection_0, and the connection_0 is established on a logical link_0. A connection group 1 uses a connection_1, and the connection_1 is established on a logical link_1. A connection group P uses all connections between a connection_m and a connection_n, where both m and n are integers greater than 1, n is greater than m. There are one or more connections between the connection_m and the connection_n, and these connections are established on a logical link_n. Each link group is allocated to one virtual node. Because different virtual nodes use different connections, contention for network resources caused by exchange between the nodes in the system is avoided.

It should be noted that the foregoing network resource pool is only an implementation provided in this embodiment, and this embodiment may further provide another implementation. For example, some or all of connections between the controller 103 and the disk enclosure form network resources, and some of the network resources are allocated to each virtual node.

Figure 5:
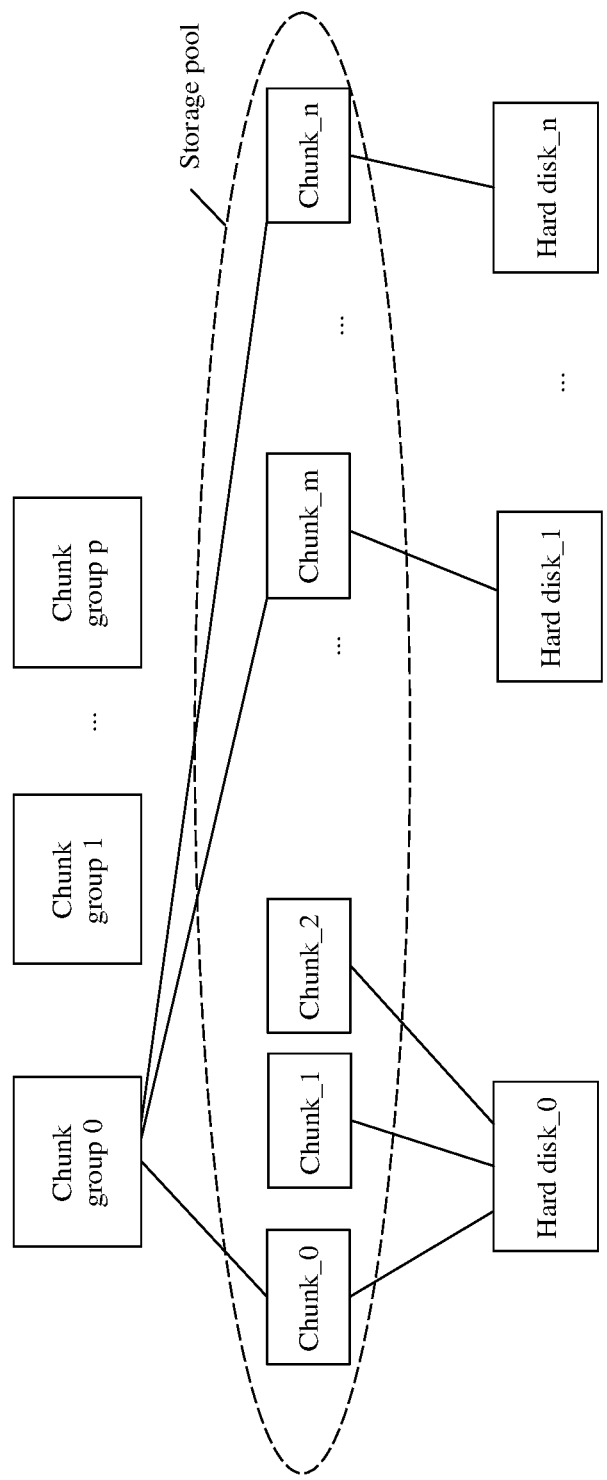
FIG. 5 is a schematic diagram of a relationship between a virtual node and a hard disk resource according to an embodiment of the present disclosure.

The hard disk resources in this embodiment are mainly capacities of all hard disks included in the storage system. FIG. 5 is a schematic diagram of an allocation relationship between a virtual node and a hard disk resource according to an embodiment of this application. As shown in FIG. 5, the disks are classified into several chunks at a specified granularity. These chunks form a storage pool. According to a redundant array of independent disks (RAID) rule, a specific quantity of chunks are selected from different disks to form a chunk group (CKG). For example, a chunk group 0 includes a chunk_0, a chunk_m, and a chunk_n. The chunk_0 is from a hard disk_0, the chunk_m is from a hard disk_1, and the chunk_n is from a hard disk_n. Each virtual node corresponds to one or more chunk groups. Because different virtual nodes use different CKGs, back-end hard disk resources are isolated.

It should be noted that the foregoing storage pool is only an implementation provided in this embodiment, and this embodiment may further provide another implementation. For example, some or all hard disks included in the storage system form hard disk resources, and some of the hard disk resources are allocated to each virtual node.

Figure 6:
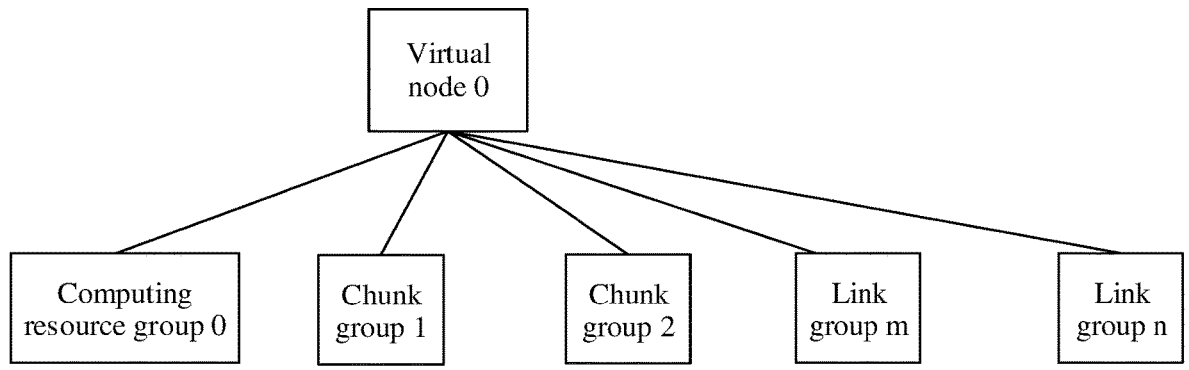
FIG. 6 is a schematic diagram of resources included in a virtual node according to an embodiment of the present disclosure.

In conclusion, each virtual node includes a CPU resource, a memory resource, a network resource, and a hard disk resource that are needed for processing a service. As shown in FIG. 6, computing resources allocated to a virtual node 0 are the computing resource group 0, hard disk resources allocated to the virtual node 0 are a chunk group 1 and a chunk group 2, and network resources allocated to the virtual node 0 are a link group m and a link group n. Resources allocated to virtual nodes are independent of each other. As a quantity of CPUs and a quantity of CPU cores increase linearly, as long as performance of a single virtual node keeps consistent by correspondingly increasing a quantity of virtual nodes, performance can be linearly expanded as a quantity of physical resources increases. This technology described in this embodiment is referred to as a Core-Farm in the industry.

Figure 7:
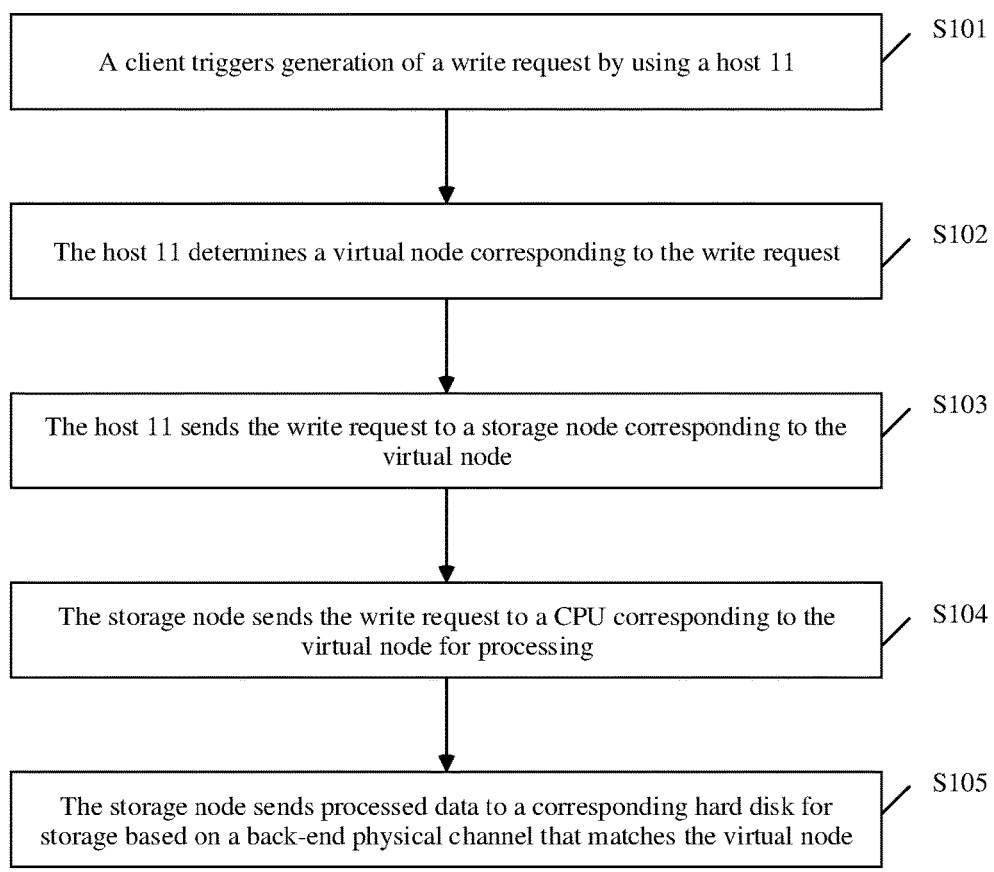
FIG. 7 is a schematic flowchart of write request processing according to an embodiment of the present disclosure.

The following describes a data storage process. FIG. 7 is a schematic flowchart of write request processing according to an embodiment. As shown in FIG. 7, the following steps are included.

S101. A client triggers generation of a write request by using a host 11, where the write request carries to-be-written data and a virtual address of the data, and the virtual address is an LUN ID, an LBA, and a length.

S102. The host 11 determines a virtual node corresponding to the write request.

Specifically, the host 11 performs hash calculation on the virtual address, to obtain a hash value. The hash value corresponds to a specific partition, and then an identifier of the partition is mapped to a specific virtual node (referred to as a target virtual node) in a plurality of virtual nodes according to a specific rule. The rule includes but is not limited to a sequential algorithm, a random algorithm, and the like. For ease of description, an example in which the target virtual node is the virtual node 0 in FIG. 5 is used in this embodiment. According to the descriptions in FIG. 3 to FIG. 5, hardware resources allocated to the virtual node 0 include the computing resource group 0, the chunk group 1, the chunk group 2, the link group m, and the link group n.

S103. The host 11 sends the write request to a storage node corresponding to the virtual node. Specifically, the host 11 stores a mapping table of a resource allocation status of each virtual node. The mapping table records a correspondence between each virtual node and each resource allocated to the virtual node (as shown in Table 1).

TABLE 1

| Virtual node | Computing resource group | Chunk group | Link group |
|---|---|---|---|
| Virtual node 0 | Computing resource group 0 | Chunk group 1 and chunk group 2 | Link group m and link group n |
| Virtual node 1 | Computing resource group 1 | Chunk group 0 | Link group 1 |
| ... | ... | ... | ... |
| Virtual node p | Computing resource group p | Chunk group p | Link group p |

The host 11 determines, based on a computing resource that corresponds to the virtual node 0 and that is recorded in Table 1, a storage node in which the computing resource is located. It can be learned from the description in FIG. 5 that a CPU corresponding to the virtual node 0 is located in the computing resource group 0. Further, it can be learned from FIG. 2 that the computing resource group 0 includes the CPU_0 and the Mem_0. Therefore, the host 11 sends the write request to a storage node (for example, the storage node 0) in which the CPU_0 is located. If there is no link between the host 11 and the storage node 0, the write request may be sent to another storage node through a link between the host 11 and the another storage node, and then the another storage node forwards the write request to the storage node 0. If there is one link between the host 11 and the storage node 0, the write request is directly sent to the storage node 0 through the link. If there are a plurality of links between the host 11 and the storage node 0, one link may be selected from the plurality of links in a polling manner or another manner, and the write request is sent to the storage node 0 through the selected link.

S104. After receiving the write request, the storage node sends the write request to a CPU corresponding to the virtual node for processing. Specifically, a front-end interface card 101 of the storage node stores a mapping table (as shown in Table 1) of a resource allocation status of each virtual node. The front-end interface card 101 may determine a corresponding target virtual node based on the virtual address carried in the write request, to further determine a CPU corresponding to the target virtual node. An example in which the target virtual node is the virtual node 0 is still used. A CPU corresponding to the virtual node 0 is the CPU_0. Therefore, the front-end interface card 101 sends the write request to the CPU_0. The CPU may perform corresponding processing on the data in the write request. Data before processing and data after processing need to be temporarily stored in a memory. It can be learned from FIG. 2 that a memory resource included in the computing resource group 0 is the Mem_0. Therefore, the data may be stored in memory space indicated by the Mem_0.

S105. The storage node sends processed data to a corresponding hard disk for storage through a back-end physical channel that matches the virtual node. Specifically, when data stored in the memory Mem_0 reaches a specific watermark, the data stored in the memory Mem_0 needs to be written into the hard disk for persistent storage. The storage node may search the mapping table for a chunk group corresponding to the target virtual node, and write the to-be-written data into the chunk group corresponding to the target virtual node. For example, it can be learned from FIG. 5 and Table 1 that chunk groups corresponding to the virtual node 0 are the chunk group 1 and the chunk group 2. It indicates that the virtual node 0 may use a hard disk resource of the chunk group 1 or a hard disk resource of the chunk group 2. It can be learned from FIG. 5 that the chunk group 0 includes the chunk_0, the chunk_m, and the chunk_n. The chunk_0 is located in the hard disk_0, the chunk_m is located in the hard disk_1, and the chunk_n is located in the hard disk_n. The storage node 0 may divide the to-be-written data into two data slices, obtain a check slice of the two data slices through calculation, and then send the two data slices and the check slice to the hard disk_0, the hard disk_1, and the hard disk_n respectively through the back-end interface card 102. In addition, the storage node 0 needs to use network resources in a network resource pool to send the data slices and the check slice. For example, network resources corresponding to the virtual node 0 include the link group m and the link group n. Therefore, the back-end interface card 102 may send the data slices and the check slice in parallel to a corresponding hard disk by using a plurality of connections included in the link group m and/or the link group n. FIG. 13 is another flowchart of capacity expansion method according to an embodiment of the present disclosure.

According to the write request processing method provided in FIG. 7, the host 11 first determines the virtual node corresponding to the write request, and then processes the request by using the hardware resources pre-allocated to the virtual node. Because resources allocated to virtual nodes are independent of each other, when the host 11 processes a plurality of data processing requests in parallel, the plurality of data processing requests do not interfere with each other.

Figure 8:
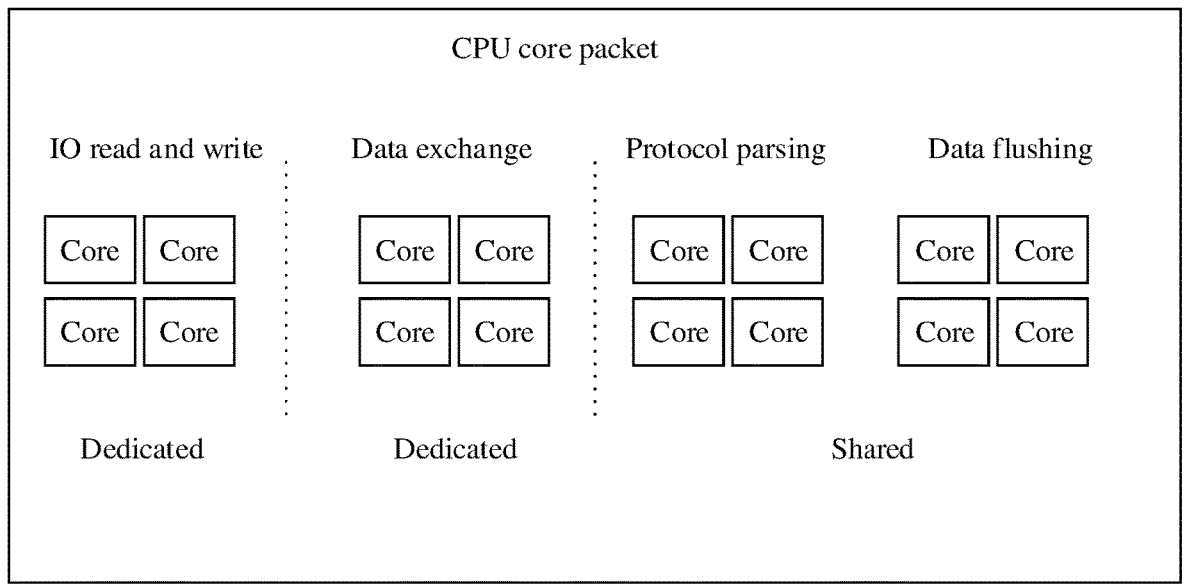
FIG. 8 is a schematic diagram of packet scheduling of a CPU core according to an embodiment of the present disclosure.

Processing the write request is used as an example for description in FIG. 7. In addition to processing a data read/write request, a storage system further processes another service request such as data exchange, protocol parsing, and data flushing. In a multi-CPU and multi-CPU-core storage system, these service requests are usually executed by a plurality of CPUs or a plurality of CPU cores in one CPU in series. A key to affecting linearity is overheads caused by cross-CPU and cross-CPU-core processing and serial execution in the storage system. In the embodiments, a CPU packet scheduling method is provided to resolve the problem. FIG. 8 is a schematic diagram of packet scheduling of a CPU core in a virtual node.

First, a virtual node corresponds to one CPU, and correspondingly, it means that one virtual node uses one CPU, or a plurality of virtual nodes share one CPU. In this way, it is ensured that service requests for a same virtual node are processed by a same CPU. Therefore, service scheduling remains independent between virtual nodes.

Then, a plurality of CPU cores included in the CPU corresponding to the virtual node are classified into several service processing groups based on service logic, and each service processing group includes one or more CPU cores. As shown in FIG. 7, a first service processing group is specially used for I/O read and write, a second service processing group is specially used for data exchange, a third service processing group is used for protocol parsing, and a fourth service processing group is used for data flushing. CPU cores included in the third service processing group and the fourth service processing group may be shared. Specifically, for example, one CPU includes 48 CPU cores. It is assumed that 12 CPU cores are allocated to the first service processing group, 12 CPU cores are allocated to the second service processing group, and 24 CPU cores are allocated to both the third service processing group and the fourth service processing group.

Different service requests are isolated in such a manner. In a single service processing group, service requests are executed in series on a CPU core allocated to the service processing group, so as to prevent the service request from contending for resources with other service requests to some extent, thereby reducing mutually exclusive operations and implementing a lock-free design. When a quantity of CPU cores included in a CPU increases, a processing capability of the CPU can also be linearly expanded. In addition, after the service requests are grouped, there is less service code than before the grouping, and the service code occupies less memory space accordingly. When a total amount of memory space remains unchanged, more space can be spared in the memory to store service data, so as to increase a memory hit rate of the data.

Similar to processing of the write request, when the client triggers a read request by using the host 11, the host 11 may determine, based on a virtual address of to-be-read data carried in the read request, a virtual node corresponding to the request, and further determine a storage node corresponding to the virtual node (similar to S103). The host 11 sends the read request to the storage node corresponding to the virtual node. After receiving the read request, the storage node sends the read request to a CPU corresponding to the virtual node for processing (similar to S104). If the to-be-read data is not hit in a corresponding memory, the CPU corresponding to the virtual node may further determine a network resource and a hard disk resource that correspond to the virtual node, and then send the request to a corresponding hard disk by using the corresponding network resource, to read the to-be-read data.

In addition, in actual application, the cost of improving a capability of the storage system by improving a single-core capability is increasing. Currently, a plurality of nodes are used in the industry, and each node has a plurality of CPU cores. In this way, a processing capability of the storage system is improved. For example, in terms of a similar single-core capability, if a quantity of cores in the storage system increases from 48 to 768, a hardware capability of the storage system improves. However, how to enable a service processing capability of the storage system to be linearly expanded as a quantity of CPU cores and a quantity of resources such as memory resources increase is a problem that all storage device vendors need to resolve. According to a capacity expansion method provided in the embodiments, the service processing capability of the storage system can be linearly expanded as a quantity of hardware resources increases. The following describes a node capacity expansion process. The process is described with reference to FIG. 3 to FIG. 6.

Figure 9:
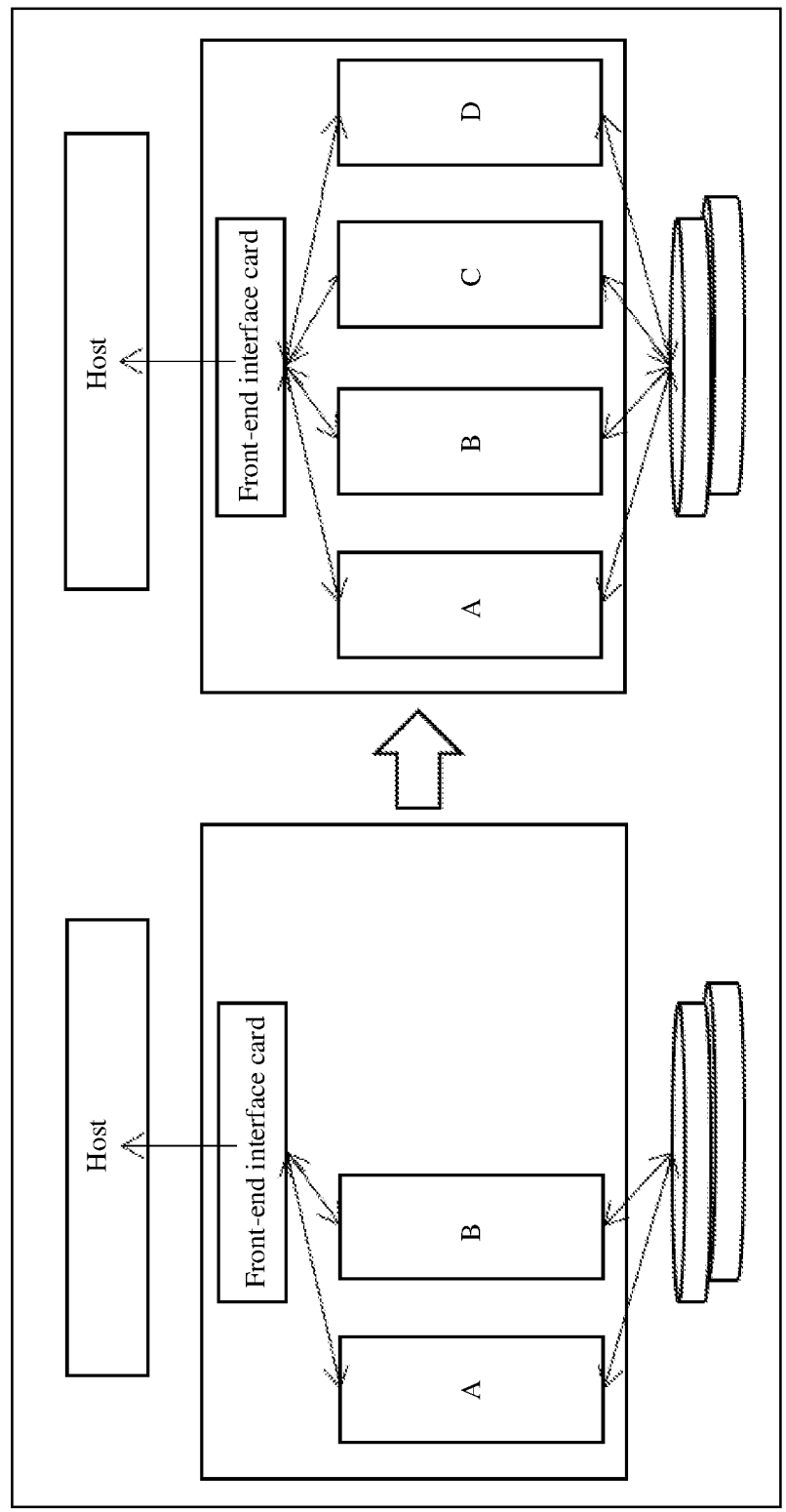
FIG. 9 is a schematic diagram of a type of capacity expansion according to an embodiment of the present disclosure.
Figure 10:
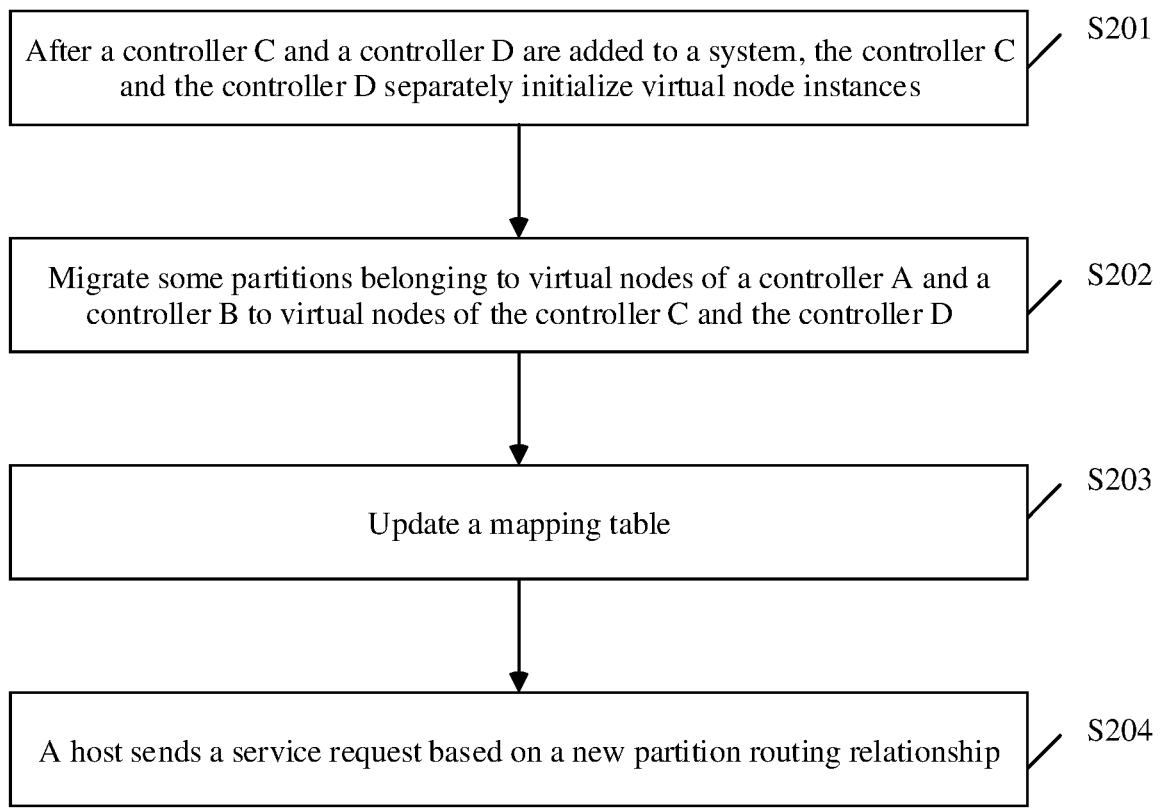
FIG. 10 is a schematic flowchart of a capacity expansion method according to an embodiment of the present disclosure.

FIG. 9 is a schematic diagram of a type of capacity expansion of a storage system according to an embodiment of this application, and FIG. 10 is a schematic flowchart of a capacity expansion method according to an embodiment of this application. This embodiment is described by using an example in which a quantity of controllers is expanded in a node. It is assumed that the node includes two controllers before expansion: a controller A and a controller B. After two controllers (a controller C and a controller D) are added, the node includes four controllers. A front-end interface card 101 and a back-end interface card 102 are shared by the controllers before and after the expansion. Specifically, as shown in FIG. 10, the expansion method includes the following steps.

S201. After the controller C and the controller D are added to the system, the controller C and the controller D separately initialize virtual node instances. It may be understood that, when a quantity of controllers increases, CPU resources and memory resources that can be provided by the entire node increase accordingly. Therefore, as long as a quantity of virtual nodes increases, a processing capability of the entire node can be improved by allocating a newly added CPU resource and a newly added memory resource to a newly added virtual node.

The controller C is used as an example. The controller C creates a plurality of virtual nodes based on a quantity of CPUs included in the controller C. Because one CPU is allocated to one virtual node in this embodiment, a quantity of virtual nodes may be less than or equal to the quantity of CPUs included in the controller C. For example, if the controller C includes eight CPUs, the controller C may create a maximum of eight virtual nodes. After the quantity of virtual nodes is determined, a mapping relationship between a newly added virtual node and a CPU and a mapping relationship between a newly added virtual node and a memory are further determined. For example, in the controller C, a virtual node x corresponds to a CPU_x (x represents a positive integer), and a memory resource needed by the virtual node x may be a local memory (for example, a Mem_x) of the CPU_x. Therefore, the CPU_x and the Mem_x form a computing resource group, which is allocated to the virtual node x. A virtual node x+1 corresponds to a CPU_x+1, and a memory resource needed by the virtual node x+1 may be a local memory (for example, a Mem_x+1) of the CPU_x+1. Therefore, the CPU_x+1 and the Mem_x+1 form another computing resource group, which is allocated to the virtual node x+1. A manner of creating a virtual node by the controller D is similar to that of creating the virtual node by the controller C.

In addition, after the controller C and the controller D are added to the system, the controller C and the controller D establish physical links with the back-end interface card 102. A plurality of logical links are created on these physical links, and a plurality of connections may be established on each logical link. These connections are added to the network resource pool shown in FIG. 4, to expand network resources in the network resource pool. These newly added network resources may be classified into several link groups, and each link group includes one or more connections. Then, each link group is allocated to one newly added virtual node. For example, the virtual node x corresponds to a link group x (x represents a positive integer), and the virtual node x+1 corresponds to a link group x+1.

S202. Migrate some partitions belonging to virtual nodes of the controller A and the controller B to virtual nodes of the controller C and the controller D. It can be learned from the foregoing description that a service request from a host 11 is routed to a virtual node based on a partition corresponding to a virtual address. When a total quantity of partitions included in the storage system remains unchanged, to enable newly created virtual nodes to bear the service request, some partitions belonging to original virtual nodes need to be migrated to the newly created virtual nodes. For example, before capacity expansion, one virtual node corresponds to one partition set, and one partition set includes 32 partitions. After capacity expansion, one virtual node corresponds to 24 partitions. One implementation is to re-establish a mapping relationship between all partitions in the storage system and all virtual nodes (including both the original virtual nodes and the newly added virtual nodes), and the other implementation is to migrate some partitions in an original partition set to the newly added virtual nodes, and retain a correspondence between the remaining partitions and the original virtual nodes. With reference to the foregoing example, eight partitions in the original partition set need to be migrated to the newly added virtual nodes. It should be noted that a quantity of to-be-migrated partitions depends on a proportion of a quantity of newly added virtual nodes in a quantity of virtual nodes included in the entire node. A migration algorithm is not limited in this embodiment, provided that partitions are evenly distributed in all virtual nodes.

S203. Update a mapping table, where the mapping table includes both a mapping table stored in the host 11 and a mapping table in the front-end interface card 101. According to the description in S201, CPU resources, memory resources, and network resources are allocated to the newly added virtual nodes. These newly added allocation relationships need to be recorded in the mapping table for processing service requests. Because there is no hard disk in the controller C and the controller D, hard disk resources needed by the newly added virtual nodes are still from the storage pool shown in FIG. 5. Specifically, chunk groups belonging to the original virtual nodes may be migrated to the newly added virtual nodes. A migration algorithm is not limited in this embodiment, provided that chunk groups allocated to all virtual nodes are approximately equal. An updated mapping table is shown in Table 2.

TABLE 2

| Virtual node | Computing resource group | Chunk group | Link group |
| --- | --- | --- | --- |
| Virtual node 0 | Computing resource group 0 | Chunk group 1 and chunk group 2 | Link group m and link group n |
| Virtual node 1 | Computing resource group 1 | Chunk group 0 | Link group 1 |
| . . . | . . . | . . . | . . . |
| Virtual node p | Computing resource group p | Chunk group p | Link group p |
| . . . | . . . | . . . | . . . |
| Virtual node x | Computing resource group x | Chunk group p + 1 | Link group x |
| Virtual node x + 1 | Computing resource group x + 1 | Chunk group p + 2 | Link group x + 1 |
| . . . | . . . | . . . | . . . |

S204. The host 11 sends the service request based on a new partition routing relationship. For a manner of processing the service request, refer to the schematic flowchart of processing a write request shown in FIG. 6. Details are not described herein again.

Figure 11:
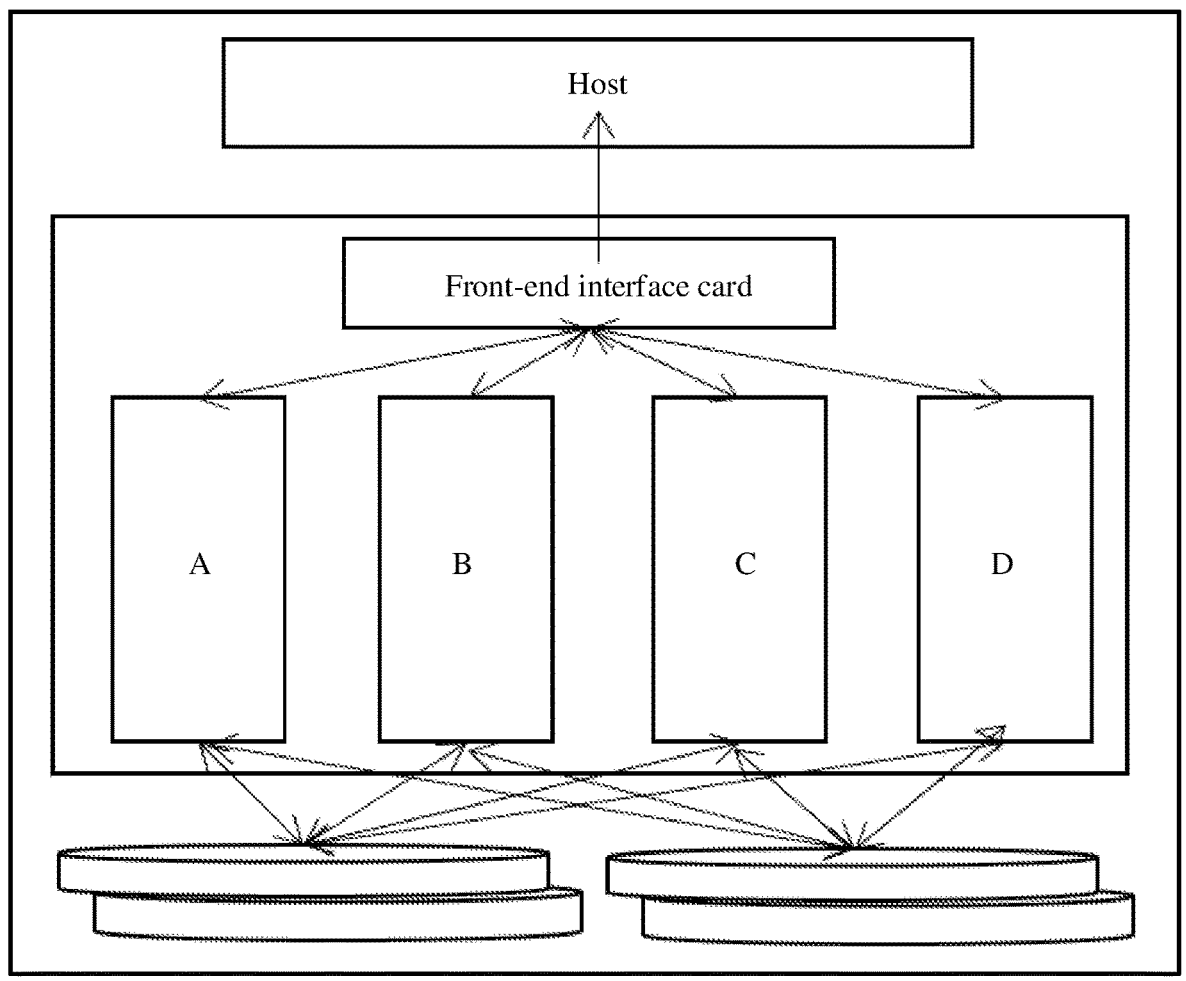
FIG. 11 is a schematic diagram of another type of capacity expansion according to an embodiment of the present disclosure.
Figure 12:
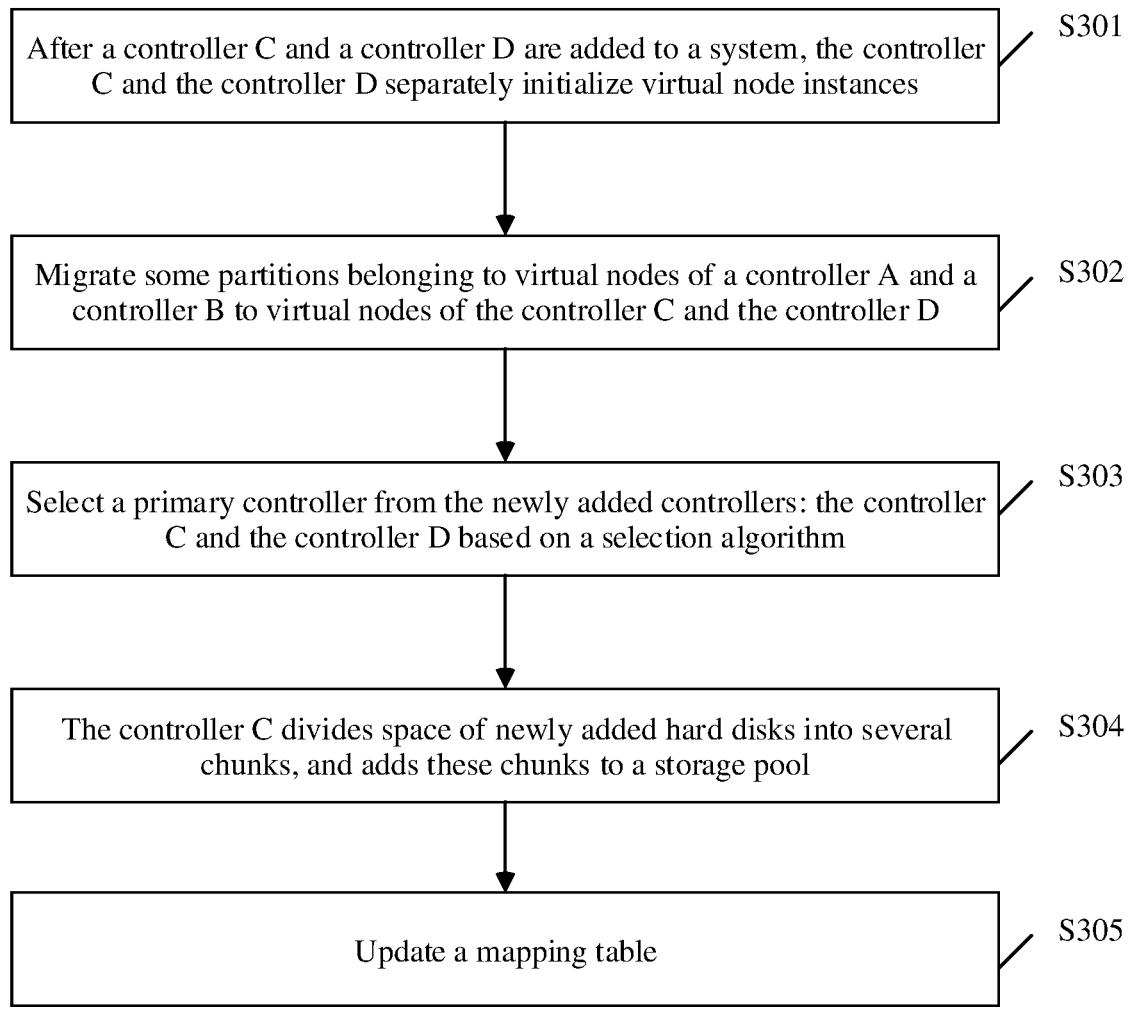
FIG. 12 is a schematic flowchart of another capacity expansion method according to an embodiment of the present disclosure.

FIG. 11 is a schematic diagram of another type of capacity expansion of a storage system according to an embodiment of this application, and FIG. 12 is a schematic flowchart of another expansion method according to an embodiment of this application. In the examples shown in FIG. 11 and FIG. 12, not only a quantity of controllers in a node is expanded, but also a quantity of disks or a quantity of disk enclosures is expanded. An example in which a quantity of controllers is expanded in a node is still used. It is assumed that the node includes two controllers: a controller A and a controller B before capacity expansion. After two controllers (a controller C and a controller D) are added, the node includes four controllers. A front-end interface card 101 and a back-end interface card 102 are shared by the controllers before and after the expansion. As shown in FIG. 12, the method includes the following steps.

S301. After the controller C and the controller D are added to the system, the controller C and the controller D separately initialize virtual node instances. For this step, refer to S201 shown in FIG. 9.

S302. Migrate some partitions belonging to virtual nodes of the controller A and the controller B to virtual nodes of the controller C and the controller D. For this step, refer to S202 shown in FIG. 9.

S303. Select a primary controller such as the controller C from the newly added controllers: the controller C and the controller D based on a selection algorithm.

S304. The controller C divides space of newly added hard disks into several chunks, and adds these chunks to a storage pool. When the controller C or the controller D receives a write request, the write request corresponds to newly added virtual nodes, and chunks from different hard disks form a chunk group to accommodate data carried in the write request. It can be learned that a plurality of newly added chunk groups in the storage pool may be allocated to the newly added virtual nods. Each virtual node uses one or more chunk groups.

S305. Update a mapping table, where the mapping table includes both a mapping table stored in a host and a mapping table in the front-end interface card 101. For this step, refer to S203 shown in FIG. 9. Different from S203, in the example in S203, a quantity of hard disk resources does not increase, and therefore chunk groups corresponding to the newly added virtual nodes are obtained by migrating chunk groups of original virtual nodes in the system. In the example in S305, because a quantity of hard disk resources also increases, the chunk groups corresponding to the newly added virtual nodes are from the newly added hard disk resources.

According to the capacity expansion manners shown in FIG. 11 and FIG. 12, newly added hard disk resources are allocated to newly added virtual nodes, and data carried in the write request corresponding to the newly added virtual nodes may be written into the newly added hard disks. However, a large amount of old data is still stored in original hard disks. To evenly distribute data stored in the system to all the hard disks, one manner is to migrate some old data to the new hard disks for storage, and another manner is not to actively migrate the old data, but migrate valid data (data that is not modified) in the old data to the newly added hard disks when garbage collection is performed on the old data. As the system runs, an increasing amount of junk data is generated. After several garbage collection operations, the data can be evenly distributed. An advantage of this manner is that because the data is not actively migrated, bandwidth overheads between nodes or between controllers can be reduced.

According to the two capacity expansion methods shown in FIG. 9 and FIG. 12, when a quantity of controllers in the system increases, a quantity of virtual nodes also increases, and newly added resources are allocated to newly added virtual nodes. In this way, fewer resources allocated to original virtual nodes are preempted to some extent. Therefore, as a quantity of hardware resources increases, a processing capability of the entire system correspondingly increases.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded or executed on a computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD), or the like.

It should be understood that, in the embodiments of this application, the term "first" and the like are merely intended to indicate objects, but do not indicate a sequence of corresponding objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a storage node, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A storage device comprising:
a disk enclosure comprising a plurality of disks configured to provide storage space; and
a plurality of controllers separately coupled to the disk enclosure, wherein each controller comprises a plurality of processors configured to provide computing resources, and each processor comprises a plurality of processor cores,
wherein logical addresses corresponding to the storage space constitute several address segment sets, wherein the computing resources are allocated according to address segment sets, and wherein computing resources allocated to different address segment sets are from different processors or from different processor cores.

2. The storage device according to claim 1, wherein each processor is associated with a memory, the computing resources further comprise memories associated with the plurality of processors, and one memory is allocated to one address segment set, and wherein different memories are allocated to different address segment sets.

3. The storage device according to claim 2, wherein a memory allocated to each address segment set is a local memory of a processor that is allocated to the address segment set.

4. The storage device according to claim 1, further comprising:
network resources provided by a plurality of connections between the plurality of controllers and the disk enclosure, wherein some of the network resources are allocated to each address segment set, and wherein different connections are allocated to different address segment sets.

5. The storage device according to claim 1, wherein the storage space comprises a plurality of chunk groups, the plurality of chunk groups provide storage resources, and some of the storage resources are allocated to each address segment set, and wherein different chunk groups are allocated to different address segment sets.

6. The storage device according to claim 1, wherein the storage space is virtualized into logical units (LUs), the LUs are provided by the storage device for a user, addresses corresponding to the LUs are classified into several logical block address logical block address (LBA) intervals, and each address segment is one LBA interval.

7. The storage device according to claim 1, wherein the storage device further comprises a front-end interface card, the plurality of controllers are separately coupled to the front-end interface card, the front-end interface card stores a mapping table, and the mapping table indicates a mapping relationship between each address segment set and allocated computing resources, and a mapping relationship between each address segment set and allocated network resources, a mapping relationship between each address segment set and allocated disk resources.

8. The storage device according to claim 1, wherein several virtual nodes are created in the storage device, one virtual node is mapped to one address segment set, and a mapping table records a mapping relationship between each virtual node and computing resources allocated to an address segment set to which the virtual node is mapped, and mapping relationship between each virtual node and network resources allocated to an address segment set to which the virtual node is mapped, and a mapping relationship between each virtual node and disk resources allocated to an address segment set to which the virtual node is mapped.

9. The storage device according to claim 1, further comprising:
a newly added controller coupled to the disk enclosure, wherein the newly added controller comprises a processor,
wherein the processor of the newly added controller is a computing resource and allocated to a first address segment in a first address segment set, and an allocation relationship between the first address segment and computing resources allocated to the first address segment set is released.

10. A resource allocation method implemented by a storage device comprising a disk enclosure and a plurality of controllers, wherein each controller comprises a plurality of processors, each processor comprises a plurality of processor cores, the plurality of controllers are separately coupled to the disk enclosure, and the disk enclosure comprises a plurality of disks, the method comprising:
providing computing resources and storage space, wherein logical addresses corresponding to the storage space are constitute several address segment sets, and each address segment set comprises one or more address segments; and
allocating the computing resources according to address segment sets, wherein computing resources allocated to different address segment sets are from different processors or from different processor cores.

11. The method according to claim 10, wherein each processor associates with a memory, and the computing resources further comprise memories associated with the plurality of processors, and the method further comprises:
allocating one memory to each address segment set, wherein different memories are allocated to different address segment sets.

12. The method according to claim 10, wherein a memory allocated to each address segment set is a local memory of a processor that is allocated to the address segment set.

13. The method according to claim 10, wherein the storage device further comprises network resources, and the network resources are provided by a plurality of connections between the plurality of controllers and the disk enclosure, and the method further comprises:
allocating some of the network resources to each address segment set, wherein different connections are allocated to different address segment sets.

14. The method according to claim 10, wherein the storage space comprises a plurality of chunk groups, and the plurality of chunk groups provide storage resources, and the method further comprises:
allocating some of the storage resources to each address segment set, wherein different chunk groups are allocated to different address segment sets.

15. The method according to claim 10, wherein the storage space is virtualized into logical units (LUs), the LUs are provided by the storage device for a user, addresses corresponding to the LUs are classified into several logical block address LBA intervals, and each address segment is one LBA interval.

16. The method according to claim 10, wherein the storage device further comprises a front-end interface card, the plurality of controllers are separately coupled to the front-end interface card, the front-end interface card stores a mapping table, and the mapping table is used to indicate a mapping relationship between each address segment set and allocated computing resources, and a mapping relationship between each address segment set and allocated network resources, and a mapping relationship between each address segment set and allocated disk resources.

17. The method according to claim 16, further comprising:
    receiving a data access request, wherein the data access request comprises a virtual address;
    searching the mapping table for computing resources allocated to the address segment set corresponding to the data access request; and
    processing the data access request by using the allocated computing resources.

18. The method according to claim 10, further comprising:
    creating several virtual nodes, wherein one virtual node is mapped to one address segment set, and a mapping table records a mapping relationship between each virtual node and computing resources allocated to an address segment set to which the virtual node is mapped, and a mapping relationship between each virtual node and network resources allocated to an address segment set to which the virtual node is mapped, and a mapping relationship between each virtual node and disk resources allocated to an address segment set to which the virtual node is mapped.

19. The method according to claim 10, further comprising:
    configuring a newly added controller, wherein the newly added controller comprises a processor, and the newly added controller is coupled to the disk enclosure;
    using the processor comprised in the newly added controller as a computing resource;
    allocating the processor to a first address segment in an address segment set;
    releasing an allocation relationship between the first address segment; and
    computing resources allocated to the address segment set.

20. A storage system comprising:
    a host; and
    a storage device coupled to the host,
    wherein the storage device comprises a disk enclosure and a plurality of controllers, each controller comprises a plurality of processors, each processor comprises a plurality of processor cores, the plurality of controllers are separately coupled to the disk enclosure, and the disk enclosure comprises a plurality of disks,
    wherein the plurality of processors are configured to provide computing resources, wherein the plurality of disks are configured to provide storage space, logical addresses corresponding to the storage space constitute several address segment sets, wherein the computing resources are allocated according to address segment sets, and
    wherein computing resources allocated to different address segment sets are from different processors or from different processor cores.

* * * * *